United States Patent
Pham Duc et al.

(10) Patent No.: US 10,464,810 B2
(45) Date of Patent: Nov. 5, 2019

(54) METHOD AND SYSTEM FOR OBTAINING HYDROGEN FROM A FEED MIXTURE WHICH CONTAINS HYDROGEN AND HYDROCARBONS

(71) Applicant: Linde Aktiengesellschaft, München (DE)

(72) Inventors: Tuat Pham Duc, Penzberg (DE); Paul Kuhn, Baierbrunn (DE)

(73) Assignee: LINDE AKTIENGESELLSCHAFT, Munich (DE)

(*) Notice: Subject to any disclaimer, the term of this patent is extended or adjusted under 35 U.S.C. 154(b) by 104 days.

(21) Appl. No.: 15/741,187

(22) PCT Filed: Jun. 29, 2016

(86) PCT No.: PCT/EP2016/065197
§ 371 (c)(1),
(2) Date: Dec. 29, 2017

(87) PCT Pub. No.: WO2017/001514
PCT Pub. Date: Jan. 5, 2017

(65) Prior Publication Data
US 2018/0186632 A1    Jul. 5, 2018

(30) Foreign Application Priority Data
Jun. 29, 2015  (EP) .................................... 15174308

(51) Int. Cl.
*C01B 3/50*  (2006.01)
*F25J 3/02*  (2006.01)
(Continued)

(52) U.S. Cl.
CPC .............. *C01B 3/56* (2013.01); *B01D 53/002* (2013.01); *B01D 53/047* (2013.01);
(Continued)

(58) Field of Classification Search
CPC ................ B01D 53/002; B01D 53/047; B01D 53/1431; B01D 53/18; B01D 2256/16;
(Continued)

(56) References Cited

U.S. PATENT DOCUMENTS

| | | | | |
|---|---|---|---|---|
| 5,546,764 | A | * | 8/1996 | Mehra ........................ C01B 3/52 62/625 |
| 6,560,989 | B1 | * | 5/2003 | Roberts .................. F25J 3/0219 62/623 |
| 2012/0151962 | A1 | | 6/2012 | Mualim et al. |

FOREIGN PATENT DOCUMENTS

| | | |
|---|---|---|
| CN | 103449950 A | 12/2013 |
| EP | 0029678 A1 | 6/1981 |

(Continued)

OTHER PUBLICATIONS

PCT/EP2016/065197 International Search Report dated Sep. 9, 2016, 3 pages.

*Primary Examiner* — Frank M Lawrence, Jr.
(74) *Attorney, Agent, or Firm* — Lathrop Gage LLP (57) ABSTRACT

To obtain hydrogen from a gaseous C2minus feed, it is cooled from a first to a second temperature level at a first pressure level forming one or more condensates. A gaseous remainder is cooled to a third temperature level and subjected to a counterflow absorption at the first pressure level, obtaining a top gas rich in hydrogen and methane and a sump liquid. The former is heated and subjected to pressure swing adsorption at the first pressure level, forming a product stream rich in hydrogen and depleted in or free from methane. The condensate(s) and/or the sump liquid is/are expanded to and fed into a low pressure demethanizer at the second pressure level. The counterflow absorption is carried out using fluid taken from the demethanizer at the second
(Continued)

pressure level, compressed in gaseous form to the first pressure level and cooled to the third temperature level.

14 Claims, 3 Drawing Sheets

(51) Int. Cl.
    *C01B 3/56*     (2006.01)
    *B01D 53/00*     (2006.01)
    *B01D 53/047*     (2006.01)
    *B01D 53/14*     (2006.01)
    *B01D 53/18*     (2006.01)
    *C01B 3/52*     (2006.01)

(52) U.S. Cl.
    CPC ......... *B01D 53/1431* (2013.01); *B01D 53/18* (2013.01); *C01B 3/506* (2013.01); *C01B 3/52* (2013.01); *F25J 3/0219* (2013.01); *F25J 3/0238* (2013.01); *F25J 3/0252* (2013.01); *C01B 2203/042* (2013.01); *C01B 2203/043* (2013.01); *C01B 2203/048* (2013.01); *C01B 2203/0415* (2013.01); *C01B 2203/147* (2013.01); *F25J 2200/70* (2013.01); *F25J 2205/02* (2013.01); *F25J 2205/04* (2013.01); *F25J 2205/30* (2013.01); *F25J 2205/40* (2013.01); *F25J 2205/60* (2013.01); *F25J 2210/12* (2013.01); *F25J 2215/62* (2013.01); *F25J 2230/08* (2013.01); *F25J 2230/60* (2013.01); *F25J 2245/02* (2013.01); *F25J 2270/02* (2013.01)

(58) Field of Classification Search
    CPC .. C01B 3/506; C01B 3/52; C01B 3/56; C01B 2203/0415; C01B 2203/042; C01B 2203/043; C01B 2203/048; C01B 2203/147; F25J 3/0219; F25J 3/0238; F25J 3/0252; F25J 2200/70; F25J 2200/2205; F25J 2200/02; F25J 2200/04; F25J 2200/30; F25J 2200/40; F25J 2200/60; F25J 2210/12; F25J 2215/62; F25J 2230/08; F25J 2230/60; F25J 2245/02; F25J 2270/02
    USPC ........ 95/92, 96, 143, 237, 209, 223; 96/121, 96/134, 243
    See application file for complete search history.

(56) References Cited

FOREIGN PATENT DOCUMENTS

FR           2463758 A1     2/1981
WO     WO 1999035110 A1     7/1999

* cited by examiner

METHOD AND SYSTEM FOR OBTAINING HYDROGEN FROM A FEED MIXTURE WHICH CONTAINS HYDROGEN AND HYDROCARBONS

The invention relates to a method and an apparatus for obtaining hydrogen from a feed mixture containing hydrogen, methane and hydrocarbons with two carbon atoms, and being low in or free from other hydrocarbons according to the pre-characterising clauses of the independent claims.

PRIOR ART

Methods and apparatus for steam cracking hydrocarbons are known and are described for example in the article "Ethylene" in Ullmann's Encyclopedia of Industrial Chemistry, online since 15 Apr. 2007, DOI 10.1002/14356007.a10_045.pub2.

In steam cracking, gas mixtures are obtained which, after the separation of water and any oily constituents present (so-called pyrolysis oil), still essentially contain hydrogen, methane and hydrocarbons with two or more carbon atoms. Gas mixtures of this kind can be separated in different separation sequences, which are fundamentally known to the skilled man and are also described in the above-mentioned article.

The present invention relates to the separation treatment of gas mixtures obtained in separation sequences of this kind, which contain hydrogen, methane and hydrocarbons with two carbon atoms and which are low in or free from other hydrocarbons. These gas mixtures may be obtained for example in so-called deethanizers and further processed in so-called demethanizers. In a demethanizer, first methane is separated, together with hydrogen, from the heavier components, i.e. the hydrocarbons having two carbon atoms.

As acetylene is typically hydrogenated upstream or downstream of the demethanizer, the hydrocarbons with two carbon atoms still predominantly or exclusively contain ethane and ethylene. In a so-called C2 splitter the ethane which is subsequently typically recycled into the steam cracking can be separated from the ethylene delivered as product.

As is also known from the literature cited, demethanizers can be operated at different pressures and are therefore referred to as low pressure (LP), medium pressure (MP) and high pressure (HP) demethanizers. It is fundamentally desirable to use low pressure demethanizers, as they result in easier separation with significantly smaller numbers of plates at the pressures of typically less than 15 bar used here, on account of the more favourable states of equilibrium between the gaseous and liquid state of the components involved. Moreover, because of the generally lower pressures, it is also possible to use structures which are less pressure-resistant and therefore less cost-intensive.

In addition to olefins such as ethylene, hydrogen is becoming increasingly important as the product of such processes. Hydrogen, particularly pure hydrogen, can be used for example for hydrogenation purposes in refineries and in some cases has a higher market value than the usual target compound of steam cracking, namely ethylene.

However, when low pressure demethanizers are used, the recovery of the hydrogen from a corresponding gas mixture containing hydrogen, methane and hydrocarbons having two carbon atoms may lead to problems, as explained in detail hereinafter. Additional problems may arise in this situation, particularly when hydrocarbons or hydrocarbon mixtures which lead to the formation of comparatively small amounts of methane are used in the steam cracking.

In CN 103449950 A, a demethanizing method is disclosed. The method includes cooling a feed mixture and forming condensates thereby. Uncondensed parts of the feed mixture are subjected to counterflow absorption. The condensates and a liquid formed in the counterflow absorption are separated in a demethanizer column. For providing an absorption liquid for the counterflow absorption, a fluid is cooled to a temperature level significantly below that to which the uncondensed parts of the feed mixture are cooled and fed into the counterflow absorption. The necessary cooling capacity is provided by expansion cooling, requiring the use of a turboexpander. This is considered disadvantageous.

Therefore, there is a need for improved methods for obtaining hydrogen from gas mixtures containing hydrogen, methane and hydrocarbons having two carbon atoms which are low in or free from other hydrocarbons, using low pressure demethanizers.

DISCLOSURE OF THE INVENTION

This problem is solved by a method and an apparatus for obtaining hydrogen from a, particularly gaseous, feed mixture containing hydrogen, methane and hydrocarbons with two carbon atoms and being low in or free from other hydrocarbons, having the features of the independent claims. Preferred embodiments are the subject of the dependent claims and the description that follows.

Before the explanation of the features and advantages of the present invention, their basis and the terminology used will be explained.

Liquid and gaseous streams may, in the terminology as used herein, be rich in or poor in one or more components, "rich" indicating a content of at least 50%, 75%, 90%, 95%, 99%, 99.5%, 99.9% or 99.99% and "poor" indicating a content of at most 50%, 25%, 10%, 5%, 1%, 0.1% or 0.01% on a molar, weight or volume basis. The term "predominantly" may correspond to the definition of "rich". Liquid and gaseous streams may also, in the terminology of the art used here, be enriched or depleted in one or more components, these terms also applying to a corresponding content in a starting mixture from which the liquid or gaseous stream was obtained. The liquid or gaseous stream is "enriched" if it contains at least 1.1 times, 1.5 times, 2 times, 5 times, 10 times, 100 times or 1,000 times the amount, "depleted" if it contains at most 0.9 times, 0.5 times, 0.1 times, 0.01 times or 0.001 times the amount of a corresponding component, based on the starting mixture. Where there is a mention of "methane" or "hydrogen", for example, this is intended to refer to a stream which is rich in the component in question but need not consist exclusively thereof.

A liquid or gaseous stream is "derived" from another liquid or gaseous stream (which is also referred to as the starting stream) if it comprises at least some components that were present in the starting fluid or obtained therefrom. A stream derived in this way may be obtained from the starting stream by separating off or deriving a partial stream or one or more components, concentrating or depleting one or more components, chemically or physically reacting one or more components, heating, cooling, pressurising and the like. Where it is stated that "fluid" from a mixture is treated in a particular way, this means that the entire mixture or only part of it may be subjected to such a treatment.

Within the scope of the present invention, distillation columns and absorption columns may be used. For the design and configuration of such equipment reference may be made to textbooks on the subject (cf. for example Sattler, K.: Thermische Trennverfahren: Grundlagen, Auslegung, Apparate, [Thermal separation methods: Principles, Design, Apparatus], 3$^{rd}$ edition 2001, Weinheim, Wiley-VCH). Typically, at least one liquid fraction (sump liquid) and a gaseous fraction (top gas) can always be removed from a distillation column and an absorption column in a lower region (sump) or upper region (top).

A "distillation column" in the terminology used here is a separating column which is arranged to at least partially separate a mixture of substances (fluid) supplied in gaseous or liquid form or in the form of a two-phase mixture with liquid and gaseous components, optionally also in the supercritical state, i.e. to produce, from the mixture of substances, pure substances or mixtures of substances which are enriched or depleted, or rich or poor, in at least one component compared with the mixture of substances, in the sense described above. Typically, distillation columns are configured as cylindrical metal containers which are equipped with fittings such as perforated plates or structured or unstructured packing. A distillation column is characterised inter alia in that the sump product is heated by means of a sump evaporator so that some of the sump product is continuously evaporated and rises in gaseous form within the distillation column. A distillation column is also typically provided with a so-called top condenser into which at least some of the top gas is liquefied to form a condensate and is added at the top of the distillation column as a liquid reflux. However, some of the top gas may also be used elsewhere, for example as a product.

Unlike a distillation column, an "absorption column" typically does not have a sump evaporator. Absorption columns are also generally known from the field of separation technology. Absorption columns are used for absorption in the phase counterflow and are therefore also referred to as counterflow columns. In counterflow absorption, the releasing gas phase flows upwards through an absorption column. The absorbing solution phase, added at the top and drawn off at the bottom, flows counter to the gas phase. The gas phase is "washed" with the solution phase. In a corresponding absorption column, fittings are also typically provided which ensure a stepwise phase contact (plates, spray zones, rotating dishes, etc.) or constant phase contact (unregulated pouring of fillings, packing, etc.).

The present application uses the terms "pressure level" and "temperature level" to characterise pressures and temperatures, the intention being to indicate that corresponding pressures and temperatures in a corresponding apparatus do not have to be used in the form of precise pressure or temperature values in order to implement the inventive concept. However, such pressures and temperatures typically vary within certain ranges which are for example ±1%, 5%, 10%, 20% or even 50% either side of a mean value. Corresponding pressure levels and temperature levels may be located in disjointed ranges or in ranges that overlap. In particular, pressure levels will include, for example, unavoidable or expected pressure losses caused, for example, by the effects of cooling. The same is true of temperature levels. The pressure levels given in bar are absolute pressures.

ADVANTAGES OF THE INVENTION

It should be expressly emphasised that the particular advantages of the present invention reside in methods for the technological separation treatment of gas mixtures containing hydrogen, methane and hydrocarbons with two carbon atoms, wherein a low pressure demethanizer as mentioned hereinbefore is used. Whereas a methane-rich fluid which is suitable as a reflux in an absorption column can typically be drawn off at the top of a high pressure demethanizer, this is not the case in low pressure demethanizers.

As is also explained hereinafter with reference to FIG. 1, when using low pressure demethanizers it is conventionally necessary to generate additional coldness, for example by expansion of a top gas from the low pressure demethanizer and/or an uncondensed residual gas, possibly using known turboexpanders.

However, this has proved to be a major disadvantage particularly in conjunction with pressure swing adsorption used to produce pure hydrogen. It is true that the additional production of cold by expansion of the above-mentioned streams makes it possible to generate, from a top gas of a low pressure demethanizer, a liquid which can be added to an adsorption column as a reflux, but the expanded gas has to be laboriously recompressed before the pressure swing adsorption. In all, one or two turboexpanders and a single- or multi-stage compressor array are conventionally required.

Rotary machines, in particular, have typically proved to be disadvantageous in such processes, however, as a significant proportion of the energy required in the industrial separation of corresponding gas mixtures has to be expended in order to operate them. The turboexpanders which are used for the additional cooling are high-maintenance and require continuous supervision. This is where the present invention comes in.

The invention proposes a method of obtaining hydrogen from an, in particular, gaseous feed mixture rich in or containing hydrogen, methane and hydrocarbons having two carbon atoms and low in or free from other hydrocarbons. Such a feed mixture is formed, as mentioned at the beginning, from a product mixture from a steam cracking process, for example, but may theoretically also come from other sources. In particular, a feed mixture within the scope of the present invention has already been freed from components which might become problematic at low temperatures, particularly water and carbon dioxide. In addition, the feed mixture within the scope of the present invention contains few or no hydrocarbons having three or more carbon atoms. The hydrocarbons having two hydrocarbons may predominantly be ethane and ethylene, but acetylene may also be present in a feed mixture of this kind, particularly if there has been no hydrogenation of corresponding compounds, after a steam cracking process, for example.

Within the scope of the present invention, fluid from such a feed mixture is cooled, at a first pressure level, from a first temperature level to a second temperature level such that one or more condensates are precipitated from the fluid of the feed mixture, leaving a residual gas. In this respect, the process according to the invention does not differ noticeably from the prior art. In particular, it is known in such processes to cool a corresponding feed mixture down in several stages, for example using C2 refrigerants, particularly ethylene. First of all, cooling takes place to about −57° C., using ethylene, to precipitate a first condensate. A residue in gaseous form (residual gas) is then further cooled to about −80° C. with ethylene and another condensate is precipitated. Conventionally, as explained in connection with FIG. 1, another condensate is precipitated after the residue, which is again gaseous, is cooled once more to about −100° C.

Within the scope of the present invention the temperature of the final cooling stage during which a condensate is precipitated from a corresponding feed mixture which has not yet been subjected to any separating equipment and into which additional streams are fed, is referred to as the "second temperature level", whereas the temperature at which the feed mixture is introduced for cooling is referred to as the "first temperature level". The first temperature level is, in particular, at −35 to −45° C., while the other temperature levels are discussed hereinafter.

The gaseous residual gas obtained at the second temperature level is further cooled to a third temperature level and subjected to counterflow absorption, thereby obtaining a top gas rich in hydrogen and methane, as well as a sump liquid. Fluid from the condensate(s) and/or sump liquid formed during cooling is expanded to a second pressure level and at this second pressure level it is fed into a low pressure demethanizer. As already mentioned, within the scope of the present application, the term "low pressure demethanizer" denotes a demethanizer which is operated at a low pressure, typically at a pressure level of 10 to 25 bar. It is provided according to the invention that the counterflow absorption is carried out at the first pressure level using fluid which is taken from the low pressure demethanizer at the second pressure level, compressed to the first pressure level in gaseous form and cooled to the third temperature level.

In other words, according to the present invention, an absorbing solution or liquid that is used as the absorbing phase in the counterflow absorption is not originally provided in liquid form but is taken in gaseous form from the low pressure demethanizer, then compressed in gaseous form to the first pressure level and then cooled and liquefied thereby. As mentioned, this fluid, i.e. the fluid which is taken from the low pressure demethanizer at the second pressure level, compressed to the first pressure level in gaseous form and then cooled, is cooled to the third temperature level only. This is possible because this fluid is compressed to the first pressure level and thus may be liquefied at a significantly higher temperature level, i.e. the third temperature level. The third temperature level is the temperature level to which also the residual gas is cooled and subjected to the counterflow absorption. Therefore, according to the present invention, no further cooling, i.e. cooling below the third temperature level, is necessary to provide a liquid reflux for counterflow absorption.

In contrast to methods as described above and as also disclosed in the prior art, e.g. in CN 103449950 A, wherein a fluid that is used as an absorption liquid for the counterflow absorption, is cooled to a temperature level significantly below that to which the residual gas is cooled and fed into the counterflow absorption in order be liquefied, according to the present invention no expansion cooling of large gas volumes is necessary. This allows for dispensing of corresponding rotary equipment which is considered disadvantageous for the reasons mentioned above. According to the present invention, only a comparatively small amount of fluid (as compared to the large amount of fluid expanded according to the prior art) needs to be compressed. A compressor used therefore thus may be provided at significantly lower costs (as compared to the expanders needed according to the prior art). Furthermore, smaller or no amounts of fluids need to be recompressed according to the present invention, if such fluids are later to be used at a higher pressure level than that they were previously expanded to.

In contrast to the prior art processes mentioned above and described by reference to FIG. 1, within the scope of the present invention absorptive purification of a residual gas which is left behind in gaseous form after cooling to the third temperature level is thus not carried out at the pressure of the low pressure demethanizer, but at a higher pressure, namely the pressure at which the cooling and condensation of the feed mixture takes place. This enables the top gas rich in hydrogen and methane, which has been taken from a corresponding counterflow absorption process, to be discharged from a corresponding apparatus at the first pressure level, at which it can be sent for pressure swing adsorption without any further compression. There is no need for re-compression and hence the use of expensive and energy-intensive compressors. All that is required within the scope of the present invention is to subject the fluid drawn off at the second pressure level in the low pressure demethanizer to compression. However, as the amount involved is comparatively small, the requisite compressor can be operated with comparatively low energy consumption. The present invention thus makes it possible to provide pure or highly pure hydrogen from a corresponding feed mixture in an economically efficient and inexpensive manner.

The present invention is theoretically suitable for various processes the specific design of which depends particularly on the methane content of the gaseous feed mixture. Different methane contents depend particularly on the origin of a corresponding feed mixture. As is known in principle, corresponding feed mixtures obtained from steam cracking processes in which ethane or ethane-rich feedstocks are used are significantly lower in methane than feed mixtures obtained from steam cracking processes in which liquid feedstocks and/or propane are cracked.

The present invention may advantageously be used for feed mixtures which contain 55 to 90 mol %, particularly 60 to 90 mol %, of methane, i.e. a comparatively high proportion of methane, which is sufficient to form a reflux in the counterflow absorption, as explained hereinafter.

In this case the fluid taken from the low pressure demethanizer and used in the counterflow absorption, which predominantly or exclusively contains methane, is used as liquid reflux, and optionally as the sole liquid reflux, in the counterflow absorption. Methane of this kind, which advantageously contains only very small amounts of hydrocarbons with two carbon atoms, is formed in sufficient quantities to wash all the hydrocarbons having two carbon atoms out of the residual gas which is subjected to the counterflow absorption, or to absorb them. Such an arrangement enables a corresponding apparatus to be set up in a particularly simple and inexpensive manner.

However, the method according to the present invention also has particular advantages in cases where the feed mixture contains only 40 to 55 mol %, particularly 40 to 50 mol %, of methane, i.e. a small amount of methane which is not sufficient to form a reflux in the counterflow absorption in order to wash all the hydrocarbons with two carbon atoms out of the residual gas.

In this case it must be established that the fluid taken from the low pressure demethanizer and used in the counterflow absorption contains methane, but also considerable amounts of ethylene, so that within the scope of the present invention it is advantageously at least partially freed from ethylene during the counterflow absorption. Therefore, this ethylene is not lost but can be fed into subsequent process steps, for example for separating ethylene from ethane.

Advantageously, in such cases, an ethane-rich reflux is used in the counterflow absorption, by means of which hydrocarbons with two carbon atoms can be washed out of both the fluid of the residual gas and also the fluid taken from the low pressure demethanizer and used in the counterflow absorption. Advantageously, an ethane-rich fluid of this kind predominantly or exclusively contains ethane. It may, for example, be separated from a sump liquid of the low pressure demethanizer, particularly in a so-called C2 splitter arranged downstream of the low pressure demethanizer. If the ethane-rich stream is not already at a sufficient pressure level, it can be brought to the first pressure level by means of a pump and used directly in liquid form, after cooling to the third temperature level, in a corresponding counterflow absorption process. The present invention is also particularly advantageous when there is a suitable external source for pressurised, optionally liquefied, ethane, for example ethane-rich natural gas or shale gas, from which ethane can easily be separated.

If a corresponding ethane-rich stream is formed from a sump liquid from the low pressure demethanizer, for example in a so-called C2 splitter as mentioned previously, the process proves advantageous, even though a certain amount of ethane from a C2 splitter of thus kind is fed back in and therefore the separation costs invested earlier are lost. This is the case because, even in counterflow absorption, only comparatively small amounts of ethane are required as the reflux stream, with only a slight adverse effect on the overall efficiency of an apparatus of this kind.

It has proved particularly advantageous if the counterflow absorption is carried out using a two-part separating unit having a first absorption section and a second absorption section, wherein the fluid of the residual gas is fed into a lower region of the first absorption section and the fluid removed from the low pressure demethanizer is fed into an upper region of the first absorption section. Gas is transferred from an upper region of the first absorption section into a lower region of the second absorption section and the ethane-rich reflux is fed into an upper region of the second absorption section. As comparatively large amounts of hydrocarbons with two carbon atoms still have to be washed out of the residual gas, but comparatively smaller amounts have to be washed out of the fluid taken from the low pressure demethanizer, an arrangement of this kind has proved particularly advantageous. As a result of the ethane-rich reflux, successive hydrocarbons with two carbon atoms can be taken up in this way, and the concentration of corresponding compounds decreases progressively towards the upper region of the second absorption section. Finally, a top gas which is substantially or completely free from hydrocarbons with two carbon atoms can thus be removed from the upper region of the second absorption section.

It has been found to be particularly advantageous if the two-part separating unit is configured as a two-part absorption column in which the first absorption section is arranged underneath the second absorption section in a common outer casing. With the two sections arranged one above the other in this way, there is no need for complicated pumps and pipes for transferring the streams mentioned above.

In another embodiment of the method according to the invention, the fluid of the residual gas is enriched in hydrogen and depleted in methane before the pressure swing adsorption, thereby particularly improving the efficiency or yield of the pressure swing adsorption and thus reducing the loss of hydrogen.

It is particularly advantageous if the fluid of the residual gas is enriched in hydrogen and depleted in methane by further cooling and precipitation of a liquid containing more methane than hydrogen from the fluid of the residual gas. Such cooling may be carried out, for example, using a further heat exchanger in which corresponding fluid is cooled to a temperature of about −152° C. This temperature is significantly below the dew point of methane at the pressures used, so that methane preferably goes over into the liquid phase.

Within the scope of the present invention, temperature levels of the kind explained hereinbefore are preferably used, the first temperature level being from −35 to −57° C. and/or the second temperature level being from −60 to −80° C. and/or the third temperature level being from −95 to −100° C., particularly from −97 to −99° C. Corresponding temperature levels may be created using ethylene as coolant, which can in turn be produced in a corresponding process.

Advantageous pressure levels within the scope of the present invention are 20 to 35 bar for the first pressure level, particularly 27 to 29 bar, and/or 10 to 25 bar for the second pressure level, particularly 12 to 15 bar. The second pressure level is below the first. This makes it possible to use a low pressure demethanizer, which has the advantages described at the beginning.

The invention also relates to an apparatus for obtaining hydrogen. Such an apparatus comprises all the means that enable it to carry out a method as described hereinbefore. For details, reference may be made to the corresponding independent claim. An apparatus of this kind benefits from all the advantages that were described hereinbefore and to which reference is therefore expressly made.

In particular, an apparatus of this kind for carrying out counterflow absorption comprises a two-part separating unit with a first absorption section and a second absorption section, particularly when such an apparatus is configured to process a feed mixture which is comparatively low in methane.

Preferred embodiments of the invention are explained in more detail hereinafter, with reference to the appended Figures, by comparison with the prior art.

BRIEF DESCRIPTION OF THE DRAWINGS

In the Figures, corresponding elements have been given identical reference numerals and their description has not been repeated, for the sake of clarity.

DETAILED DESCRIPTION OF THE DRAWINGS

Figure 1:
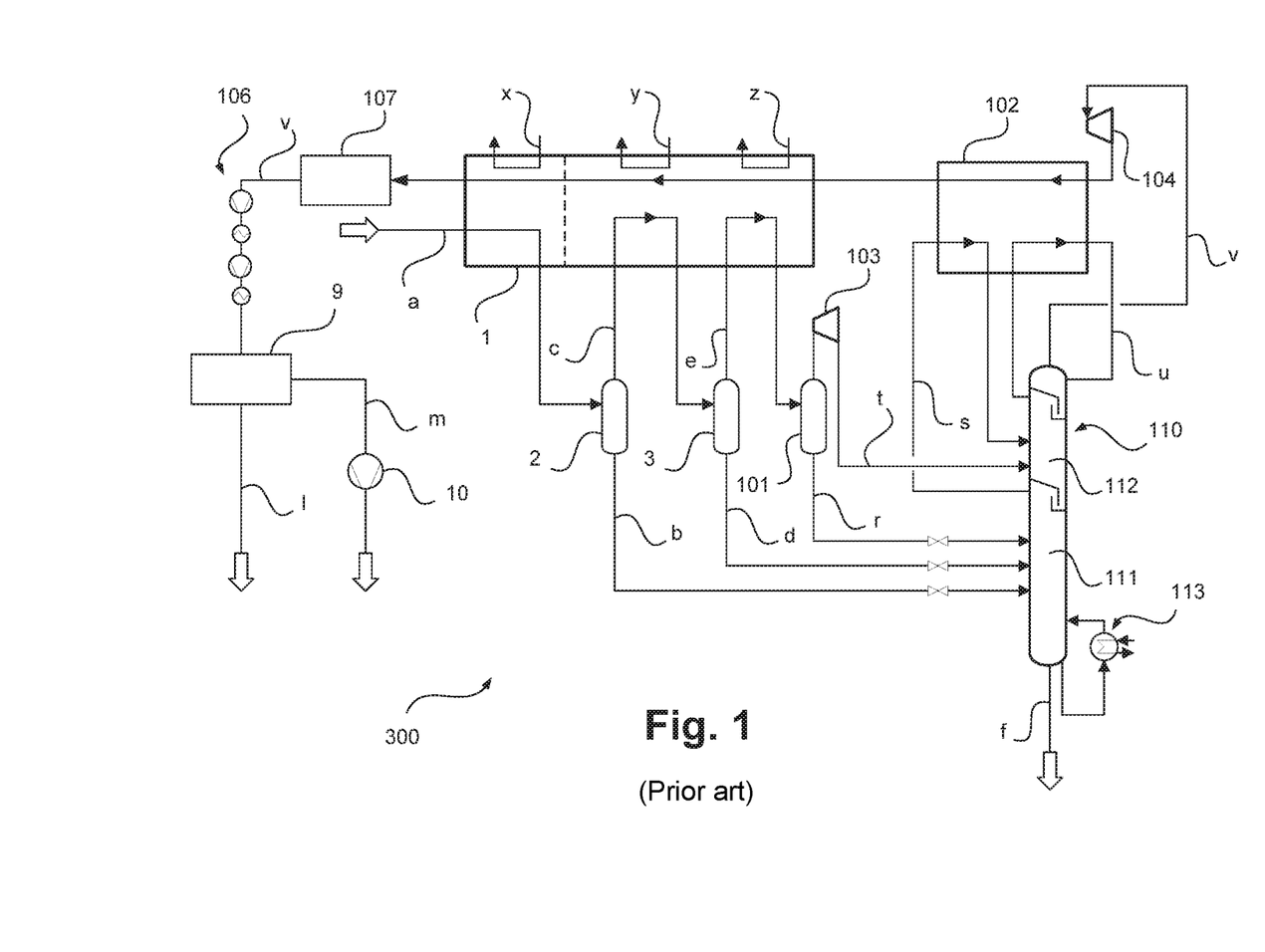
FIG. 1 shows a method which is not according to the invention, in the form of a schematic process flow diagram.

FIG. 1 shows a method, not according to the invention, for obtaining hydrogen from a feed mixture containing hydrogen, methane and hydrocarbons with two carbon atoms which is low in or free from other hydrocarbons, in the form of a schematic process flow diagram, generally designated 300.

The feed mixture, which contains hydrogen, methane and hydrocarbons with two carbon atoms and is low in or free from other components, is supplied, in the embodiment shown, in the form of a stream a to the warm side of a heat exchanger 1, which, in contrast to the embodiment shown, may also be in the form of a plurality of heat exchangers, heat exchanger sections or blocks.

The heat exchanger 1 may for example be operated with C2-refrigerants such as ethylene in the form of the streams x, y and z, wherein the stream x for example is provided at a temperature of −57° C., the stream y for example is provided at a temperature of −80° C. and the stream z for example is provided at a temperature of −100° C.

After removal from the heat exchanger 1 at an intermediate temperature level the stream a is fed into a first precipitation container 2. As a result of the cooling in the heat exchanger 1 a liquid condensate is precipitated in the first precipitation container 2, and can be drawn off in the form of a liquid condensate stream b. Uncondensed fluid of the stream a is passed through the heat exchanger 1 again in the form of the stream c, where it is cooled further, and finally fed into a second precipitation container 3. A liquid condensate stream, here designated d, and a gaseous stream, here designated e, are also taken from the second precipitation container 3. The stream e is cooled again in the heat exchanger 1 and then fed into a third precipitation container, here designated 101.

A liquid condensate stream r taken from the third precipitation container 101 is transferred, together with the liquid condensate streams b and d from the first precipitation container 2 and the second precipitation container 3, into a separating unit 110, which comprises a demethanizer section 111 and an absorption section 112. Both the demethanizer section 111 and the absorption section 112 are operated at the pressures that are conventional for a low pressure demethanizer, for example at 12 to 14 bar in the embodiment shown.

The demethanizer section 111 is operated with a sump evaporator 113 in which, for example, ethylene can be used as the heat medium. A stream f which predominantly contains hydrocarbons with two carbon atoms and is low in or free from other components can be drawn off from a sump of the demethanizer section 111. From the top of the demethanizer section a stream s is drawn off, liquefied in another heat exchanger 102 and added as reflux to the absorption section 112.

In addition, a stream t is fed as reflux into the absorption section 112, which has been removed in gaseous form from the third precipitation container 101 and expanded in a turboexpander 103. By using the reflux in the form of the stream s any remaining hydrocarbons with two carbon atoms which have not gone into the liquid phase and hence into the stream r in the third precipitation container 101 can be precipitated from the stream t. In this context, a stream u is also used, which is removed from the absorption section 112 at the top end, also liquefied in the heat exchanger 102 and then fed into an upper region of the separating unit 110.

To enable the streams s and u to be liquefied, considerable amounts of cold are required which can only be provided by the use of a turboexpander 104 which expands a stream v drawn off from the upper region of the separating unit 110. However, as a result of the expansion of the stream v, this stream from which hydrogen is to be obtained is at a pressure which is still significantly above the pressure at which the separating unit 110 is operated.

To obtain pure hydrogen, for which purpose pressure swing adsorption 9 is provided, it is therefore necessary to re-compress the stream v in one or more compressor stages 106. Precooling 107 is carried out beforehand. As mentioned several times, the operation of the compressor stage(s) 106 in particular has proved decidedly energy-intensive and also problematic in terms of the maintenance of the apparatus required.

During pressure swing adsorption 9 a hydrogen-rich product stream l and a so-called tail gas stream m are obtained from the stream v. The tail gas stream m, which advantageously contains essentially all the methane from the streams a and v and smaller amounts of hydrogen, is compressed in a compressor 10 to a suitable pressure, for example to a pressure as required for use in firing, and also discharged.

Figure 2:
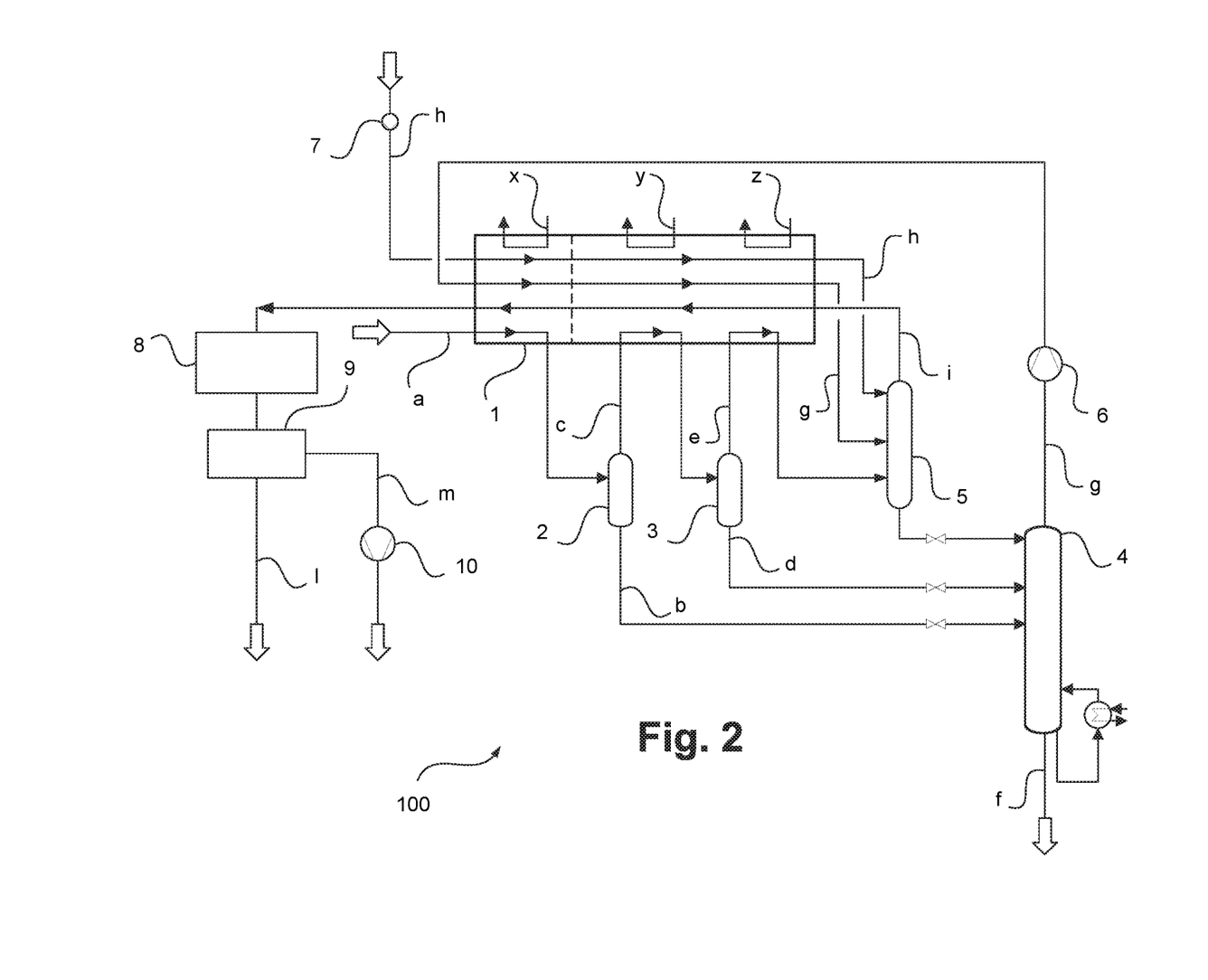
FIG. 2 shows a method according to one embodiment of the invention, in the form of a schematic process flow diagram.

FIG. 2 shows a method according to one embodiment of the invention in the form of a schematic process flow diagram which is generally designated 100.

In contrast to the method 300 illustrated in FIG. 1, in the method 100 shown in FIG. 2 only two precipitation containers 2 and 3 are used. The stream e drawn off in gaseous form from the top of the second precipitation container 3 is fed into a separating unit designated 5, the operation of which will be described hereinafter.

Like the liquid condensate streams b, d and r in the method 300 shown in FIG. 1, the liquid condensate streams b and d in the method 100 shown in FIG. 2 are also transferred into a corresponding separating unit, here designated 4. In contrast to the separating unit 110 in the method 300 shown in FIG. 1, the separating unit 4 in the method 100 shown in FIG. 2 is a pure distillation column, i.e. functionally an apparatus corresponding to the demethanizer section 111 of the separating unit 110. A sump evaporator of the separating unit 4 (not specifically designated) may be heated, for example with ethylene, like the sump evaporator 113 of the separating unit 110 in the method 300 shown in FIG. 1. Here, too, a corresponding stream f which predominantly or exclusively contains hydrocarbons with two carbon atoms is drawn off from the sump of the separating unit 4.

From the top of the separating unit 4, which is configured as a low pressure demethanizer, a stream designated g is drawn off, compressed in gaseous form in a compressor 6 and then cooled in the heat exchanger 1. As a result of the above-mentioned compression, the fluid of the stream g, which is upstream of the compressor 6 at the pressure of the low pressure demethanizer 4 and would not be capable of liquefaction at this pressure at the temperatures of the heat exchanger 1, reaches a pressure that is sufficient to enable liquefaction. Therefore, in contrast to the prior art, no expansion of large fluid volumes is necessary to be able to provide temperatures below that which the heat exchanger 1 is able to provide. For advantages thereof, reference is made to the explanations above. After cooling in the heat exchanger 1 to a temperature of about −98° C. the stream g is also fed into the separating unit 5.

If, in the method 100 shown in FIG. 2, comparatively small amounts of methane and comparatively large amounts of hydrogen are provided in the stream a, because the stream a originates, for example, from the steam cracking of feedstocks predominantly containing ethane, the stream g contains comparatively large amounts of ethylene, but comparatively little methane. If the stream g were to be fed exclusively into the separating unit 5 there would therefore be a danger of comparatively large losses of ethylene into a top stream i, which is removed from the top end of the separating unit 5.

Therefore, in the method 100 which is illustrated in FIG. 2, a reflux stream h which predominantly or exclusively contains ethane and has been cooled to the third temperature level in the heat exchanger 1 is added to the separating unit 5. A corresponding stream h may be removed, for example, from a C2 splitter to which the stream f is supplied, or the stream h may consist at least partly of ethane which has been supplied externally. If the stream h is not already at a sufficient pressure for use in the separating unit 5, its pressure is increased by means of a pump 7.

As a result of the operation of the separating unit 5 as described, the ethylene of the stream g, which goes at least partially into the gaseous phase in the separating unit 5, can be washed back, thereby minimising ethylene losses into the stream i.

The stream i thus still consists predominantly or exclusively of methane and hydrogen. It is heated in the heat exchanger 1 and subjected to heating to about 20 to 25° C. in a unit 8, without any further pressurisation. The stream i is then fed into the pressure swing adsorption 9, in which the streams l and m described earlier with reference to the method 300 illustrated in FIG. 1 are formed.

The method 100 illustrated in FIG. 2 has proved particularly advantageous, as, in contrast to the re-compression of the stream v, which has to be carried out in the method 300 illustrated in FIG. 1, no such re-compression is required. This can particularly be put down to the fact that there is no need for any additional cooling to liquefy a top stream g from the separating unit 4 (in contrast to the streams s and u in the method 300 illustrated in FIG. 1). The stream i, according to FIG. 2, is already at a pressure that is suitable for use in the pressure swing adsorption 9. The top stream of the separating unit 4 simply has to be compressed in a relatively small amount by means of the (cold) compressor 6. The operation thereof proves to be significantly more favourable as much smaller amounts have to be compressed therein. Moreover, in the embodiment shown, a further absorption medium is provided by the use of the stream h, which again does not require any additional cooling for its preparation in the method 100.

Although FIG. 2 shows a method 100 in which a stream h is used which predominantly or exclusively contains ethane, in certain cases it may also be sufficient to simply feed the streams e and g into the separating unit 5. This is particularly the case when the stream a contains amounts of methane which are sufficient for the backwashing of ethylene in the separating unit 5. This is particularly the case when the stream a originates from the steam cracking of liquid feedstocks or gaseous feedstocks such as propane or combined feedstocks (consisting, for example, of naphtha, ethane and LPG). In this case, the methane content of the stream g is sufficient to enable adequate backwashing of hydrocarbon with two carbon atoms in the separating unit 5 even without the additional use of the stream h.

Figure 3:
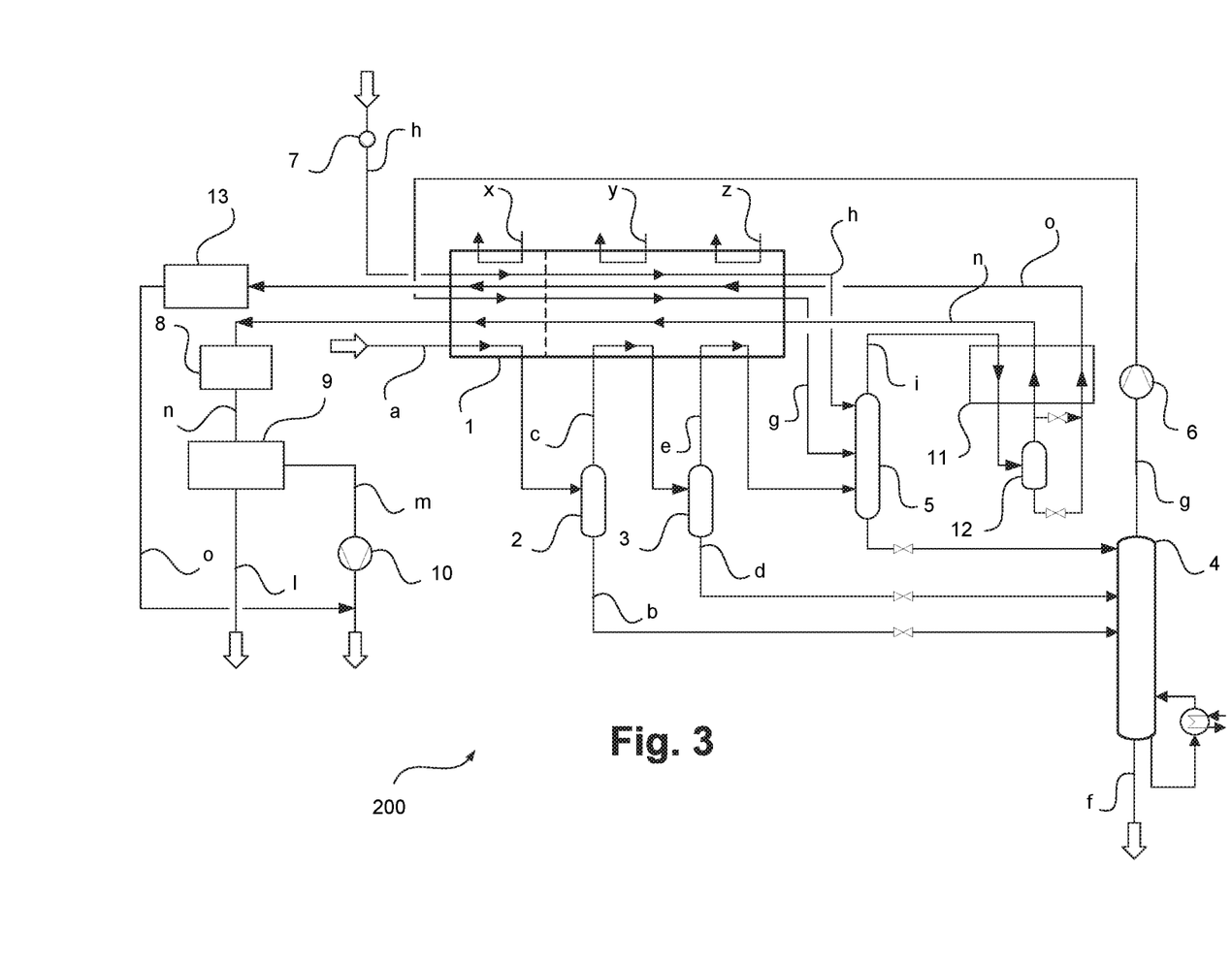
FIG. 3 shows a method according to one embodiment of the invention, in the form of a schematic process flow diagram.

FIG. 3 shows a variant of the method 100 shown in FIG. 2, which is generally designated 200. This is a method according to another embodiment of the invention.

In contrast to the method 100 shown in FIG. 2, here the stream i is passed through another heat exchanger 11 and cooled therein to a temperature of approx. −152° C., for example. Then the stream i, which has been at least partially liquefied by cooling in the further heat exchanger 11, is transferred into a precipitation container 12, from the sump of which a methane-enriched and hydrogen-depleted stream o is removed and from the top of which a hydrogen-enriched and methane-depleted stream n is removed. The two streams are heated in the heat exchanger 1, the stream n being treated in the same manner as the stream i in method 100, which is shown in FIG. 2. As a result of the already considerable enrichment of the stream n with hydrogen, this stream n can be treated in the pressure swing adsorption 9 with significantly better yields, thus making it easier to produce pure hydrogen in the form of the stream l. After being heated in the heat exchanger 1 the stream o is cooled further in a unit 13 and combined with the stream m downstream of the compressor 10.

The invention claimed is:

1. Method (100, 200) for obtaining hydrogen from a feed mixture containing hydrogen, methane and hydrocarbons with two carbon atoms and low in or free from other hydrocarbons, wherein fluid of the feed mixture is cooled from a first temperature level to a second temperature level at a first pressure level, while one or more condensates are precipitated out of the fluid of the feed mixture, leaving a residual gas, fluid of the residual gas is further cooled to a third temperature level and subjected to a counterflow absorption, thereby obtaining a top gas rich in hydrogen and methane and a sump liquid, fluid of the top gas is heated and subjected to pressure swing adsorption (9) at the first pressure level, to form a product stream which is rich in hydrogen and depleted in or free from methane, and fluid of the condensate or condensates and/or of the sump liquid is expanded from the first pressure level to a second pressure level and is fed into a low pressure demethanizer at the second pressure level, characterised in that the counterflow absorption is carried out at the first pressure level using fluid which has been taken from the low pressure demethanizer at the second pressure level, compressed in gaseous form to the first pressure level and cooled to the third temperature level.

2. Method (100, 200) according to claim 1, wherein the feed mixture contains 55 to 90, particularly 60 to 90, mol % of methane.

3. Method (100, 200) according to claim 2, wherein the fluid taken from the low pressure demethanizer and used in the counterflow absorption predominantly or exclusively contains methane and is used as liquid reflux in the counterflow absorption.

4. Method (100, 200) according to claim 1, wherein the feed mixture contains 30 to 55, particularly 30 to 40, mol % of methane.

5. Method (100, 200) according to claim 4, wherein the fluid taken from the low pressure demethanizer and used in the counterflow absorption contains methane and ethylene and is at least partly freed from the ethylene in the counterflow absorption.

6. Method (100, 200) according to claim 4, wherein an ethane-rich reflux is used in the counterflow absorption, by means of which hydrocarbons with two carbon atoms are washed out both from the fluid of the residual gas and from the fluid taken from the low pressure demethanizer and used in the counterflow absorption.

7. Method (100, 200) according to claim 6, wherein the counterflow absorption is carried out using a two-part separating unit having a first absorption section and a second absorption section, in which the fluid of the residual gas is fed into a lower region of the first absorption section and the fluid taken from the low pressure demethanizer is fed into an upper region of the first absorption section, a gas is transferred from an upper region of the first absorption section into a lower region of the second absorption section and the ethane-rich reflux is fed into an upper region of the second absorption section.

8. Method (100, 200) according to claim 7, wherein the two-part separating unit is configured as a two-part absorption column (5) in which the first absorption section is arranged underneath the second absorption section in a common outer casing.

9. Method (100, 200) according to claim 1, wherein the fluid of the residual gas is enriched in hydrogen and depleted in methane before the pressure swing adsorption (9).

10. Method (100, 200) according to claim 9, wherein the fluid of the residual gas is enriched in hydrogen and depleted in methane by further cooling and precipitation of a liquid containing more methane than hydrogen from the fluid of the residual gas.

11. Method (100, 200) according to claim 1, wherein the first temperature level is at 35 to −57° C. and/or the second temperature level is at −60 to −80° C. and/or the third temperature level is at −95 to −100° C., particularly at −97 to −99° C.

12. Method (100, 200) according to claim 1, wherein the first pressure level is at 20 to 35 bar, particularly at 27 to 29 bar, and/or the second pressure level is at 10 to 25 bar, particularly at 12 to 15 bar.

13. Apparatus for obtaining hydrogen from a feed mixture containing hydrogen, methane and hydrocarbons with two carbon atoms and low in or free from other hydrocarbons, with means that are configured:
- to cool fluid of the feed mixture from a first temperature level to a second temperature level at a first pressure level, so that one or more condensates are precipitated out of the fluid of the feed mixture, leaving a residual gas,
- to further cool fluid of the residual gas to a third temperature level and subject it to counterflow absorption, thereby obtaining a top gas rich in hydrogen and methane and a sump liquid,
- to heat fluid of the top gas and to subject it to pressure swing adsorption (9) at the first pressure level, thereby forming a product stream which is rich in hydrogen and depleted in or free from methane, and
- to expand fluid of the condensate or condensates and/or of the sump liquid from the first pressure level to a second pressure level and to feed it into a low pressure demethanizer at the second pressure level, characterised by means which are configured to carry out the counterflow absorption at the first pressure level using fluid which is taken from the low pressure demethanizer at the second pressure level, compressed in gaseous form to the first pressure level and cooled to the third temperature level.

14. Apparatus according to claim 13 which, for the purpose of carrying out the counterflow absorption, comprises a two-part separating unit having a first absorption section and a second absorption section, means being provided which are configured to feed the fluid of the residual gas into a lower region of the first absorption section and to feed the fluid taken from the low pressure demethanizer into an upper region of the first absorption section, to transfer gas from an upper region of the first absorption section into a lower region of the second absorption section and to feed an ethane-rich reflux into an upper region of the second absorption section.

* * * * *